US 12,320,163 B2

(12) United States Patent
Enger et al.

(10) Patent No.: US 12,320,163 B2
(45) Date of Patent: Jun. 3, 2025

(54) MULTICABLE LOCKOUT DEVICE

(71) Applicant: Brady Worldwide, Inc., Milwaukee, WI (US)

(72) Inventors: Andrew N. Enger, Muskego, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 119 days.

(21) Appl. No.: 18/208,153

(22) Filed: Jun. 9, 2023

(65) Prior Publication Data

US 2024/0003167 A1    Jan. 4, 2024

Related U.S. Application Data

(60) Provisional application No. 63/356,800, filed on Jun. 29, 2022.

(51) Int. Cl.
*E05B 73/00* (2006.01)

(52) U.S. Cl.
CPC ................. *E05B 73/0005* (2013.01)

(58) Field of Classification Search
CPC .. E05B 73/0005; E05B 67/383; E05B 67/006; E05B 13/002; E05B 67/36; E05B 67/003; F16G 11/106; F16G 11/14
USPC .......................................................... 70/174
See application file for complete search history.

(56) References Cited

U.S. PATENT DOCUMENTS

| | | | | |
|---|---|---|---|---|
| 3,765,061 A | * | 10/1973 | Nash | A43C 7/08 |
| | | | | 24/134 P |
| 4,766,835 A | | 8/1988 | Randall et al. | |
| 4,788,755 A | * | 12/1988 | Kasai | B65D 63/16 |
| | | | | 24/136 R |
| 5,517,835 A | * | 5/1996 | Smith | E05B 73/0005 |
| | | | | D8/333 |
| 5,823,020 A | | 10/1998 | Benda | |
| 5,842,359 A | * | 12/1998 | Longueira | E05C 19/182 |
| | | | | 70/237 |
| 7,293,438 B2 | | 11/2007 | Benda | |
| 7,337,504 B1 | * | 3/2008 | Casey | B63B 21/08 |
| | | | | 24/134 P |

(Continued)

FOREIGN PATENT DOCUMENTS

| | | | | |
|---|---|---|---|---|
| CA | 3154068 A1 | * | 10/2022 | ........... E05B 67/003 |
| EP | 3919709 A1 | | 12/2021 | |
| EP | 4067694 A1 | * | 10/2022 | ........... E05B 67/003 |

OTHER PUBLICATIONS

European Patent Office, Extended European Search Report, Application No. 23179281.3, Nov. 27, 2023, 5 pages.

*Primary Examiner* — Suzanne L Barrett
(74) *Attorney, Agent, or Firm* — Quarles & Brady LLP

(57) ABSTRACT

A multicable lockout device comprises a housing including at least two cable end securement points, a stationary cleat fixed relative to the housing, and at least two rotatable cleats attached to the housing. Each of the rotatable cleats is positioned adjacent to the stationary cleat with a respective cable-receiving pathway being defined between the shared stationary cleat and each of the respective rotatable cleats. The respective rotatable cleats each have a tip biased towards the shared stationary cleat to facilitate one-way gripping action of a cable along the respective cable-receiving pathway. This structure permits two cable loops to be independently formed utilizing only three cleats for gripping the cables.

15 Claims, 4 Drawing Sheets

(56) References Cited

U.S. PATENT DOCUMENTS

| | | | |
|---|---|---|---|
| 8,234,757 B2* | 8/2012 | Lesley | B60P 7/0823 24/68 CD |
| 10,352,068 B2* | 7/2019 | Hollis | E05B 67/006 |
| 2006/0174460 A1* | 8/2006 | Borsoi | F16G 11/106 24/712.5 |
| 2011/0067211 A1 | 3/2011 | Huber et al. | |
| 2015/0315822 A1* | 11/2015 | Garthe | E05B 73/0005 70/15 |
| 2021/0381277 A1 | 12/2021 | Enger et al. | |
| 2023/0193978 A1 | 6/2023 | Enger et al. | |

* cited by examiner

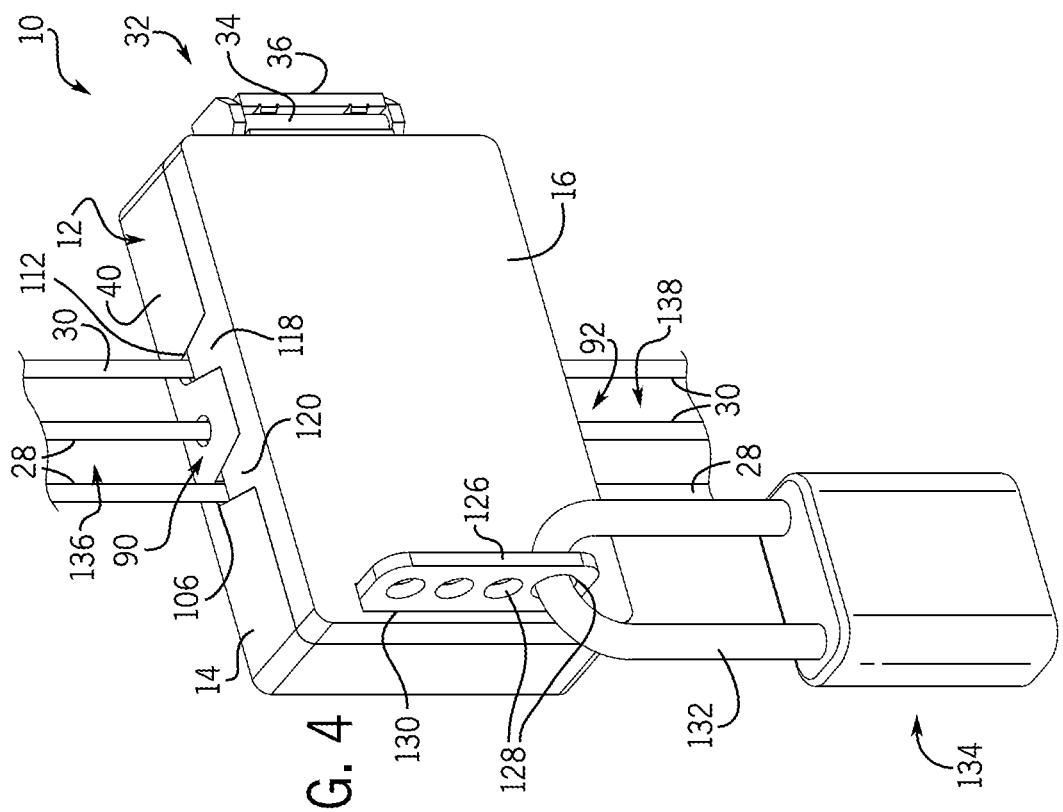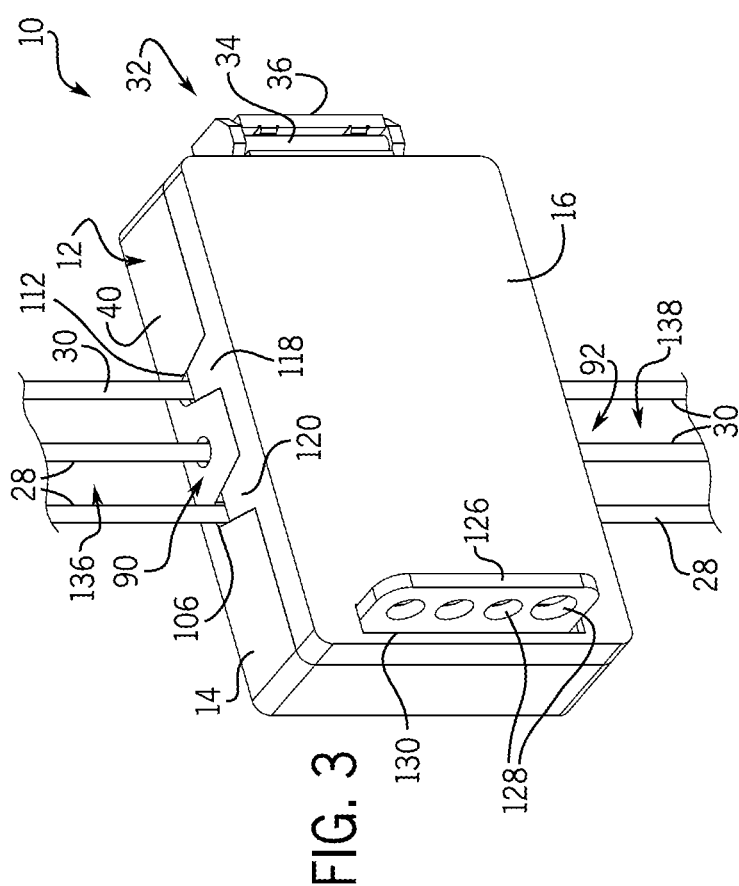

MULTICABLE LOCKOUT DEVICE

CROSS-REFERENCE TO RELATED APPLICATION

This application claims the benefit of U.S. Provisional Patent Application No. 63/356,800 entitled "Multicable Lockout Device" filed on Jun. 29, 2022, which is incorporated by reference herein for all purposes.

TECHNICAL FIELD

This disclosure relates to a lockout device in which multiple cables can be formed into separate cable loops that are independently closeable and which may be, for example, used to lockout a control or energy isolation point.

BACKGROUND

Lockout devices are conventionally used to secure controls or energy isolation points during the maintenance or servicing of equipment. For instance, if a particular control or energy isolation point needs to be turned off to safely perform maintenance on equipment, then a lockout device may be installed on the control or the energy isolation point to physically prevent others from mistakenly turning that control back on until the work is complete. Such lockout devices often include the ability for multiple users to lockout a control simultaneously, for example, by permitting each user to attach their own separate padlock to the lockout device to secure the lockout device in place on the control. In such case, the lockout device cannot be removed and the control operated until all the individual padlocks are removed from the lockout device.

One type of lockout device is a cable lockout device. These cable lockout devices are so named because they include a cable as part of the lockout device in which that cable can be run through the control and formed into a closed loop, with the closed loop preventing the operation of that control while the cable lockout device remains in place. An example of a cable lockout device can be found, for example, in U.S. Pat. Nos. 5,823,020 and 7,293,438 to Brady USA, Inc. and Brady Worldwide, Inc., respectively, and which are incorporated by reference herein. Such cable lockout devices can be well suited for locking out the rotatable spoked handles of valve controls, for instance, but may be used in other contexts as well.

SUMMARY

While cable lockout devices are known, most cable lockouts involve a single cable that may be routed through various elements before being secured. This can result in long cable runs and potentially messy installation of the lockout device.

Disclosed herein in an improved cable lockout device in which multiple cable are used having cable gripping structures with at least one shared stationary cleat. Each of the cables can be run between that shared stationary cleat and another rotatable or biased cleat in which that rotatable or biased cleat is unique to and corresponds to the individual cable being secured. In this way, two or even more cables can be secured by a cleat set having fewer than an expected number of cleats and with a lockout device having less complex construction. So, for example, rather than having two sets of biased cleats, to accommodate two cables, for a total of four biased cleats, three cleats total could be employed one of which is stationary or fixed and two of which are biased cleats.

Such a multicable lockout device could be used various applications in which having multiple independent loops would be of utility. For example, two valve handles could be secured to one another using independent loops that can be separately tightened. Still further, such a multicable lockout device could be standalone device; combined with another structure or device in which that other structure or device includes other lockout modalities or not; or mounted on a fixed surface such as a wall, floor, or stationary apparatus.

According to one aspect, a multicable lockout device is disclosed. The device includes a housing including at least two cable end securement points for receiving ends of corresponding cables. The housing has a base section and cover section that is movable relative to the base section between an opened position and a closed position. The device further includes a stationary cleat fixed relative to the base section of the housing and at least two rotatable cleats attached to the base section. Each of the respective rotatable cleats is positioned adjacent to the stationary cleat with a respective cable-receiving pathway being defined between the stationary cleat and each of the respective rotatable cleats. The respective rotatable cleats each have a tip biased towards the stationary cleat to facilitate one-way gripping action of a corresponding cable along the respective cable-receiving pathway. When in the closed position, the respective cable-receiving pathways between the stationary cleat and each respective rotatable cleat can be securely covered by the cover section and this cover section can be lockable relative to base section to prevent the cover section from being taken out of the closed position while locked.

In some forms, the multicable lockout device may further include at least two cables. Each one of the at least two cables may have a respective first end secured at one of the at least two cable end securement points of the housing. This securement can involve, for example, the housing having an opening through which one of the cables can be received and the cable can have a collar on one end that is larger than the opening to secure the end of the cable relative to that opening. Each one of the cables also may have a respective second end that is receivable through one of the respective cable-receiving pathways. In this way, multiple loops may be formed, with the cables being anchored at the cable end securement points and being pullable in one direction through the cable-receiving pathways at least while the cover section is locked in the closed position. The cable can be withdrawn from the cable-receiving pathways after the cover section is moved to the opened position, thereby permitting any formed loops to be broken.

In some forms, the multicable lockout device may further include a hinge connecting the base section to the cover section. The hinge may include a pair of hinge parts in which one of the hinge parts is an integral part of the base section and another of the hinge parts is an integral part of the cover section.

In some forms, the rotatable cleats may be on opposing sides of the stationary cleat such that the respective cable-receiving pathways are also on opposing sides of the stationary cleat. Each of the rotatable cleats may have a respective axis of rotation and the stationary cleat may be positioned along a line between or connecting the respective axes of rotation of the rotatable cleats.

In some forms, the base section may have a tab with a plurality of lock openings and the cover section may have a slot for receiving the tab when the cover section is in the closed position. When the cover section is in the closed position, the plurality of lock openings may be on a side of the cover section opposite the stationary cleat and at least two rotatable cleats. The plurality of lock openings may be sized to receive a shackle of a padlock to lock the cover section in the closed position.

In some forms, the cable end securement points may be on oppositely facing peripheral sides of the housing.

In some forms, the housing may include peripheral walls as part of one or more of the base section and cover section. The peripheral walls can include cable openings formed therein between the base section and the cover section for accommodating passage of a cable therethrough, which cable is also passable through at least one of the respective cable-receiving pathways.

In some forms, the rotatable cleats may be biased by a respective torsion spring with legs that separately engage the base section of the housing and part of the respective rotatable cleats.

In some forms, the rotatable cleats may include guidance pegs that are received in guidance slots in the base section of the housing. An interaction of the guidance pegs with the guidance slots can delimit an angular rotation of the rotatable cleats relative to the housing.

In some forms, the stationary cleat may include at least one fixation peg that is received in at least one fixation hole in the base section of the housing. An interaction of the fixation peg and the fixation hole can prevent the stationary cleat from rotating relative to the base section of the housing.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 3 is a front, left, top perspective view of the multicable lockout device of FIG. 1 but in which the multicable lockout device is in the closed position with the cover section closed relative to the base section to secure lengths of the cables within the cleat gripping structure and in the closed housing.

FIG. 4 is a front, left, top perspective view of the multicable lockout device of FIG. 3 in the closed position further in which a padlock has been attached to lock the device in the closed position.

DETAILED DESCRIPTION

Unless otherwise defined, the technical terms or scientific terms as used in the claims and the description should be construed in a generic meaning as understood by those of ordinary skill in the art to which the present invention pertains. The terms "first", "second", or the like as used in the description and claims of the patent application do not denote any order, quantity, or importance, but are merely used to distinguish different components. The terms "a", "an" or "the" like do not denote a quantity limitation but mean that there is at least one. The terms "include", "comprise" or the like mean that the elements or objects that precede "include" or "comprise" encompass the elements or objects and their equivalents that appear after "include" or "comprise" and do not exclude other elements or objects. The terms "connect", "connected" or the like are not limited to physical or mechanical connections, nor are they limited to direct or indirect connections.

Figure 1:
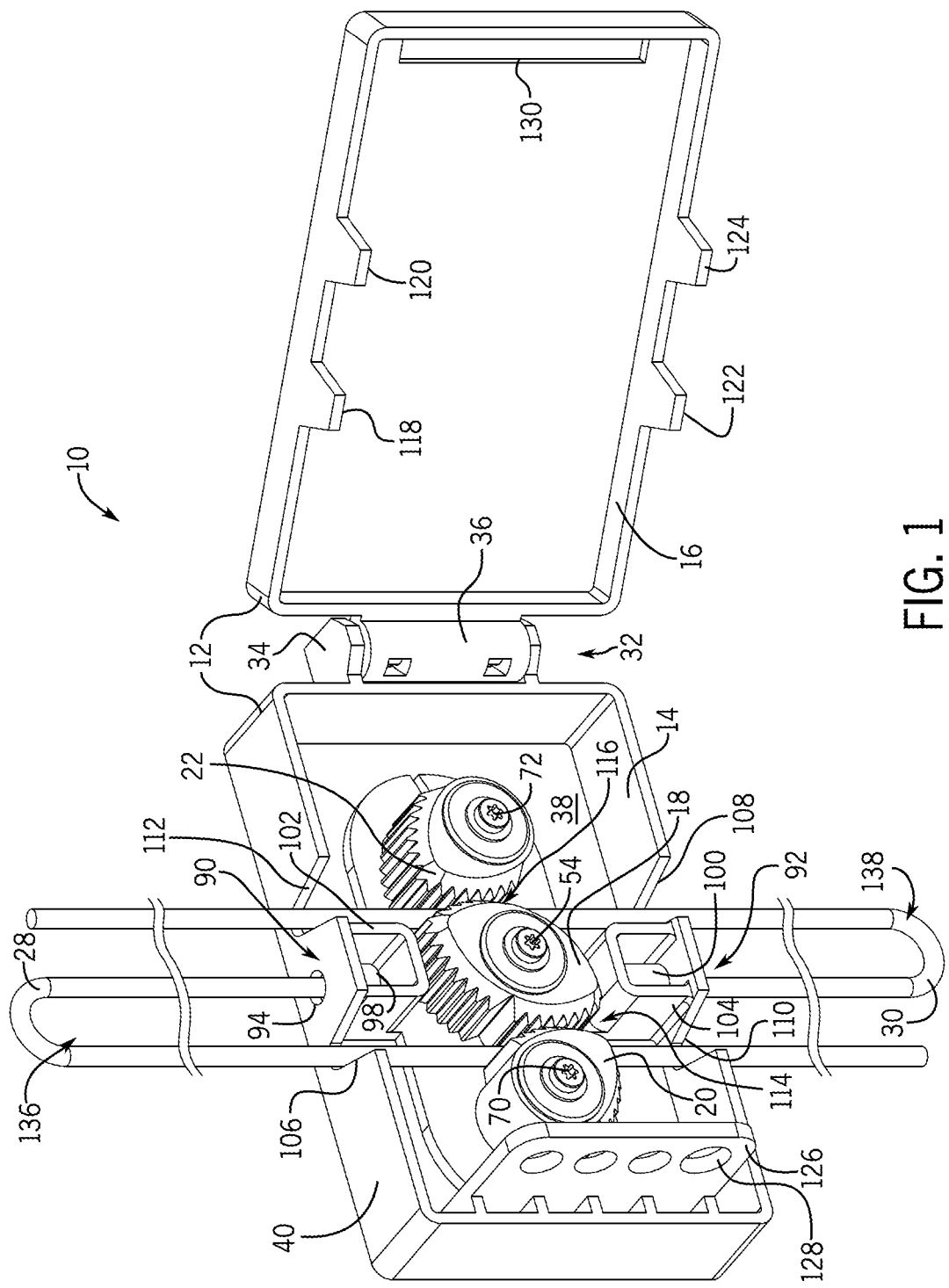
FIG. 1 is a front, left, top perspective view of the multicable lockout device in an opened position with the cover section in an opened position relative to the base section showing the cleat gripping structure with a shared stationary cleat and pair of rotatable cleats on either side thereof.

The terms "top", "bottom", "front", "rear", "left", "right", and so forth used herein are exemplary directions defined only for facilitating the description. For example, as shown in FIG. 1, the directions toward the reader are front, left, and top (given the perspective view) and the directions away from the reader is rear, right, and bottom. Of course, those skilled in the art would be able to understand that the directions such as "top", "bottom", "front", "rear", "left", and "right" can be defined in other ways, which also fall within the scope of protection of the present disclosure.

A structure having an "integral design" is a component formed from one piece of material, such as a molded piece. A structure having a "composite design" is a component formed from more than one distinct piece (or part), which upon assembly are combined.

Referring to FIGS. 1 through 5, a multicable lockout device 10 is illustrated. This exemplary multicable lockout device 10 can be used to create a pair of cable loops using a three-cleat arrangement in which the loops can be independently reduced. The multicable lockout device 10 potentially can be used in various types of lockout applications for which having more than one secured cable loop would be of utility and can be integrated into other structures.

As illustrated, the multicable lockout device 10 includes a housing 12 having a base section 14 and cover section 16, three cleats including a stationary cleat 18 and a pair of rotatable cleats 20 and 22 (which rotatable cleats 20 and 22 have corresponding torsion springs 24 and 26 for biasing the rotation of the rotatable cleats 20 and 22), and two cables 28 and 30.

Figure 2:
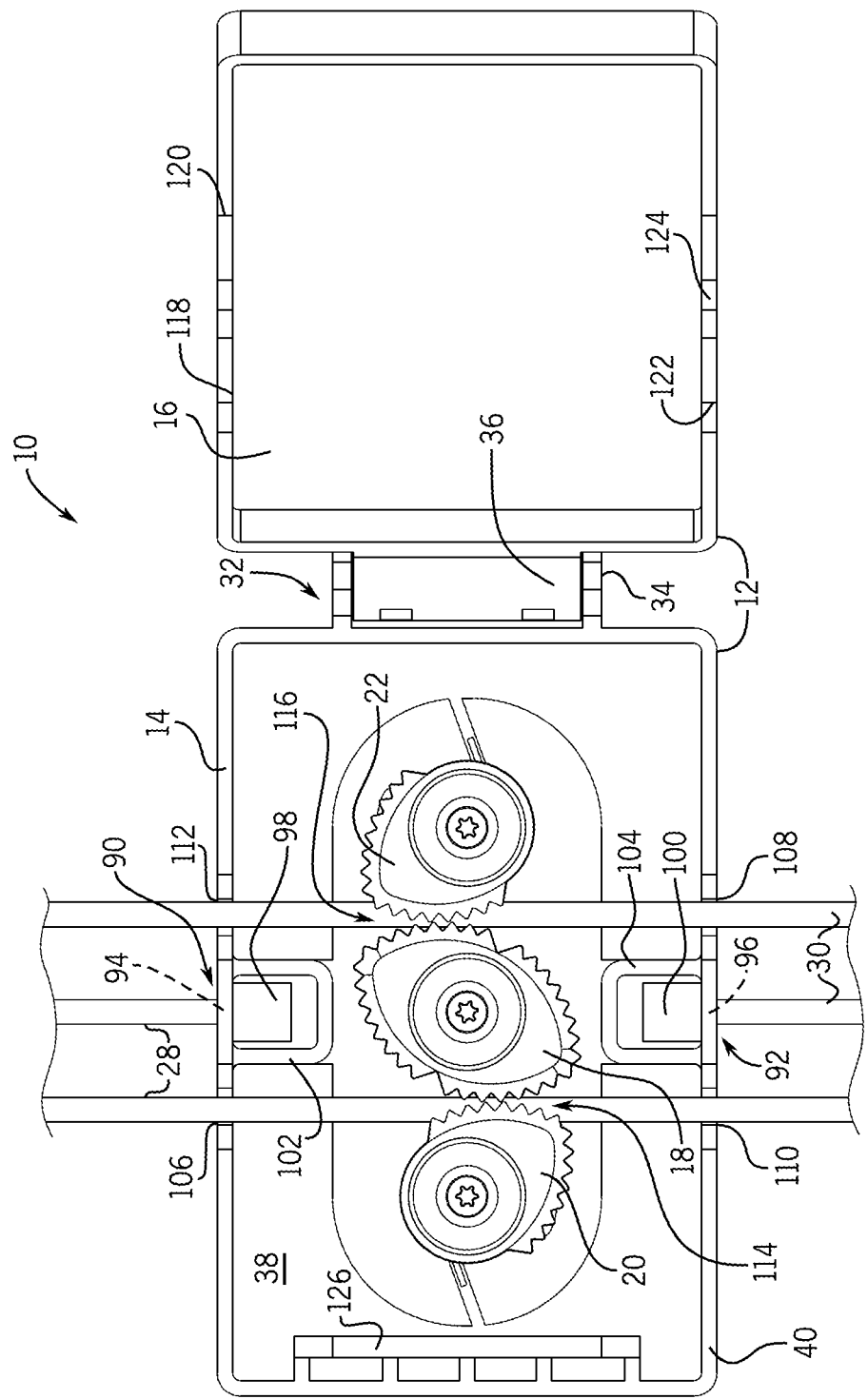
FIG. 2 is a front plan view of the multicable lockout device of FIG. 1.

Looking first at the housing 12, the housing includes the base section 14 and cover section 16. The cover section 16 is movable relative to the base section 14 between an opened position, as is depicted in FIGS. 1 and 2, and a closed position, as is depicted in FIGS. 3 and 4.

In the form illustrated, a hinge 32 connects the base section 14 to the cover section 16 to provide the movability of the sections 14 and 16 with respect to one another. The hinge 32 as shown includes a pair of hinge parts 34 and 36 disposed on the right side of the base section 14 relative to the orientation of the device 10 in the figures. One of the hinge parts 34 is an integral part of the base section 14 and provides a pin portion for the hinge 32. The other one of the hinge parts 36 is an integral part of the cover section 16 and provides a C-shaped portion for the hinge 32. The C-shaped portion is snappable onto a forward-facing section of the pin portion when the cover section 16 is opened sufficiently with respect to the base section 14 to connect the pin portion of the hinge part 34 and the C-shaped portion of the hinge part 36 together and to establish the mechanical connection of the hinge 32. When the cover section 16 is closed relative to the base section 14 as is depicted in FIGS. 3 and 4, the C-shaped portion rotates with the movement of the cover section 16 to a rearward side of the pin portion (again relative to the orientation of the device on the page) such that the hinge 32 cannot be separated by unsnapping the hinge parts 34 and 36 from one another when the housing 12 is closed, as attempting to move the C-shaped portion away from the pin portion is prevented by the interference of the cover section 16 and the base section 14 in this closed position.

It is contemplated that the cover section 16 could be movable relative to the base section 14 in other ways, whether hinged or not. The hinged arrangement particularly depicted in the figures is merely provided as one exemplary way of creating a hinged connection between the sections of the housing 12 to limit access to the cleat gripping structure supported by the base section 14. However, it is envisioned the hinge or connection between the sections 14 and 16 could take other forms, while providing the same functionality with respect to the movability of the cover section 16 with respect to the base section 14 of the housing 12. It is contemplated that, in some forms, the hinge as depicted could be replaced by a living hinge and thereby make the base section 14 and the cover section 16 of the housing 12 one continuous solid body having an integral design.

Figure 5:
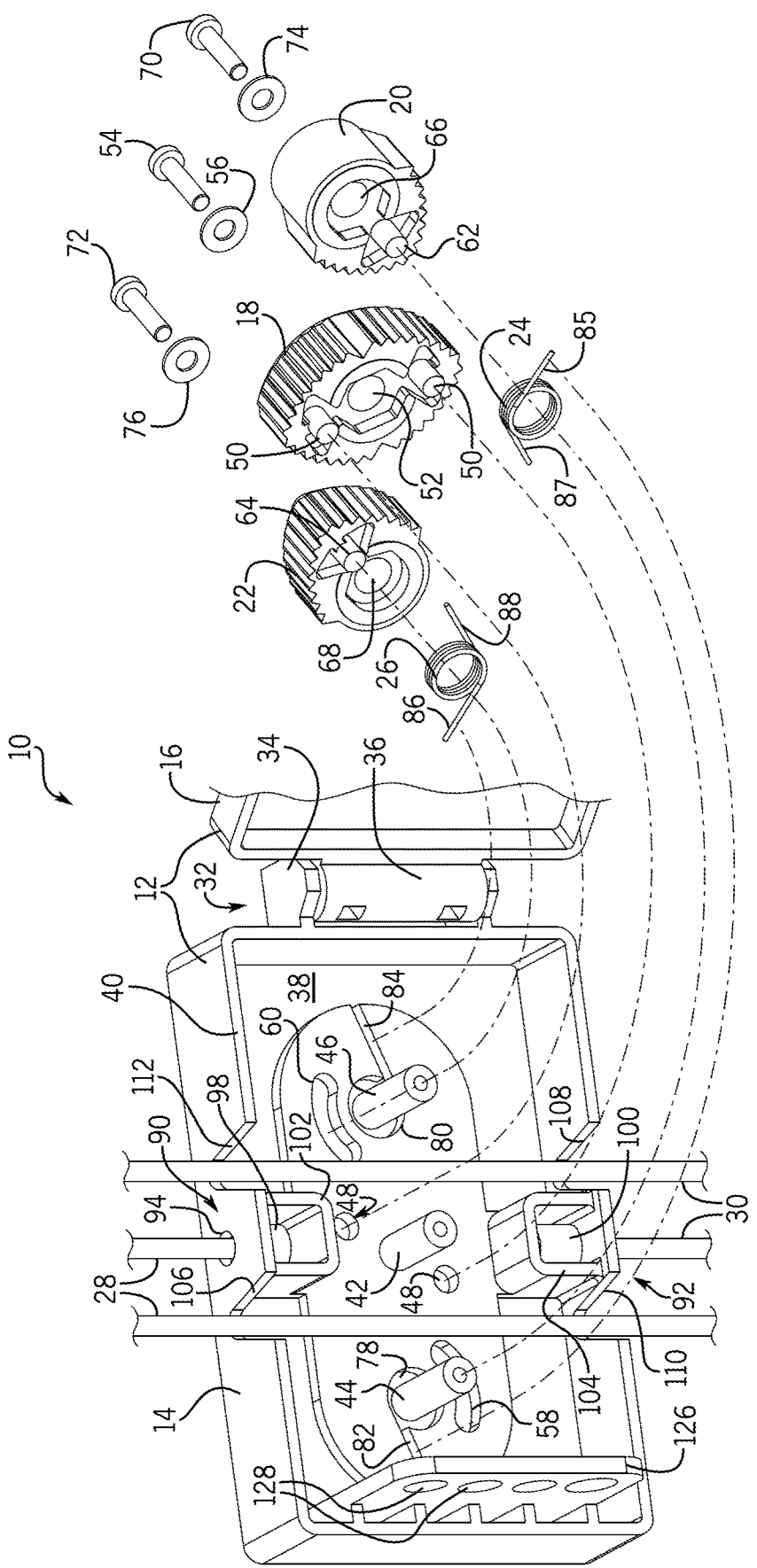
FIG. 5 is an exploded book view of the device as illustrated in FIG. 1 with the cleats, torsion springs, and mounting hardware being shown apart from the base section of the housing to illustrate how the various cleats are attached relative to the base section.

With additional and particular reference being made to FIG. 5, the base section 14 includes a base wall 38 and peripheral or lateral walls 40 that extend forwardly from the base wall 38. Various features are formed in the base wall 38 and lateral walls 40 that support operation of the multicable lockout device 10.

It is understood that while FIGS. 1 through 5 depict a housing 12 with a substantially rectangular cross-sectional shape, the housing 12 is not limited to such cross-sectional shape. Nonlimiting examples of suitable housing 12 cross-sectional shapes include square, rectangle, trapezoid, triangle, pentagon, oval, circle, and semi-circle.

The base wall 38 includes three posts that extend perpendicularly to and forwardly from the base wall 38 for attaching the cleats 18, 20, and 22. These three posts include a post 42 that is centrally located for axially receiving the stationary cleat 18 and a pair of posts 44 and 46 that are each for axially receiving one of the pair of rotatable cleats 20 and 22, respectively.

On the base wall 38 around the post 42 for the stationary cleat 18, a set of fixation holes 48 are formed in the base wall 38 for engaging corresponding fixation pegs 50 on the stationary cleat 18 to prevent the stationary cleat 18 from rotating or moving relative to the base section 14 once the stationary cleat 18 is attached to the post 42 by mounting hardware. More particularly and as depicted in FIG. 5, the stationary cleat 18 has an opening 52 extending axially therethrough in which the post 44 is received and then a screw 54 and washer 56 are then used to axially secure the stationary cleat 18 onto the post 42 which, in conjunction with the engagement of the fixation holes 48 and the fixation pegs 50, fix the stationary cleat 18 relative to the base wall 38.

On the base wall 38 around the posts 44 and 46 for the rotatable cleats 20 and 22, a pair of guidance slots 58 and 60 are formed that are generally arcuate in shape that are for engaging a corresponding guidance peg 62 and 64 on an axially facing side of the rotatable cleats 20 and 22. The interaction of the guidance slots 58 and 60 and the guidance pegs 62 and 64 can delimit the angular rotational range of motion of the rotatable cleats 20 and 22 relative to the base section 14 and, by the fact it is fixed to the base section 14, the stationary cleat 18. The rotational cleats 20 and 22 have axial openings 66 and 68 that are axially received on the posts 44 and 46, respectively, and can be attached to the base section 14 of the housing 12 by the use of screws 70 and 72 and washers 74 and 76 that axially retain the rotational cleats 20 and 22 on the posts 44 and 46, but still allow rotational movement of the rotational cleats 20 and 22 about their respective shared axis with the posts 44 and 46 and as limited by the guidance slots 58 and 60 and the guidance pegs 62 and 64.

One of ordinary skill in the art will appreciate that the fixation pegs 48 and the fixation holes 50 as well as the guidance slots 58 and 60 and the guidance pegs 62 and 64 could be oppositely arranged on the components to similar effect. For instance, fixation pegs could extend outwardly from the base wall and engage fixation holes formed on a facing side of the stationary cleat.

Additionally in the proximity of the posts 44 and 46 for the rotatably cleats 20 and 22, spring receiving recesses 78 and 80 are formed in the base wall 38 that encircle the posts 44 and 46. These spring receiving recesses 78 and 80 have spring leg receiving slots 82 and 84 that extend generally radially outwardly therefrom (slightly more accurately, the spring leg receiving slots 82 and 84 can be approximately tangent to the central ring of the recesses 78 and 80 about the posts 44 and 46 as depicted in FIG. 5). The spring leg receiving slots 82 and 84 receive the legs 85 and 86 of corresponding torsion springs 24 and 26 which are interposed between the posts 44 and 46 and the rotatable cleats 20 and 22 and that are used to the bias the rotation of the rotatable cleats 20 and 22 about their shared axes with the posts 44 and 46. The other of the legs 87 and 88 of the torsion springs 24 and 26 are received against an internal feature, such as a wall or internal ledge, in the axial openings 66 and 68 on the rear axial side of the rotatable cleats 20 and 22.

Turning to other prominent features on the base section 14 of the housing 12, the base section 14 also provides a pair of cable end securement points 90 and 92 formed in the housing 12. In the device 10 illustrated, these cable end securement points 90 and 92 are positioned on the top and bottom sides of the peripheral walls 40 and each include an opening 94 and 96 formed through the top and bottom sides of the peripheral wall 40. The cables 28 and 30 have stops or collars 98 and 100 secured on one of their ends and, as can be seen in FIGS. 1, 2, and 5, a free end of the cable 28 and 30 can be first be threaded through the respective openings 94 and 96 and the cable 28 and 30 advanced until the stop 98 and 100 blocks the end of the cable 28 and 30 from further advancing and passing through the respective opening 94 and 96 of the respective cable end securement point 90 and 92 (by virtue of the size of the stop 98 and 100 being larger than the size of the opening 94 and 96). To prevent the end of the cable 28 and 30 from being fed back into the interior side of the peripheral walls 40 and becoming tangled or jamming or interfering with the operation of the cleats as will be described in further detail below, the cable end securement points 90 and 92 can also have guard walls 102 and 104 that prevents the cables 28 and 30 with the stops 98 and 100 from being pushed into the cleats. It will be appreciated that while the figures depict cables 28 and 30 with stops or collars 98 and 100 securable to the housing 12, the cables 28 and could alternatively be fastened (such as with a screw), or otherwise connected to the housing 12. In some embodiments, the cables 28 and 30 are replaceable with another cable for any one of several reasons (such as, for example, cable wear, replacing the cable with a cable of a different diameter or material, and so on). A nonlimiting example of a suitable cable 28, 30 is a nylon and/or polyvinyl chloride (PVC) coated steel cable.

The peripheral walls 40 of the base section 14 also have cable inlet openings 106 and 108 and cable outlet openings 110 and 112 to permit passage of the free end of the cables 28 and 30 into and out of the interior of the housing 12 when the sections 14 and 16 are closed. As can be best seen in FIGS. 1 and 2 (with the housing 12 opened), there are cable-receiving pathways 114 and 116 between the stationary cleat 18 and the rotatable cleats 20 and 22, respectively. The cable inlet opening 106 is positioned above the cable-receiving pathway 114 and the cable outlet opening 110 is positioned below the cable-receiving pathway 114 such that the free end of the cable 28 would pass through the cable inlet opening 106, through the cable-receiving pathway 114 between the rotational cleat 20 and the stationary cleat 18, and down and out of the cable outlet opening 110. Likewise, the cable inlet opening 108 is positioned below the cable-receiving pathway 116 and the cable outlet opening 112 is positioned above the cable-receiving pathway 116 such that the free end of the cable 30 would pass through the cable inlet opening 108, through the cable-receiving pathway 116 between the rotational cleat 22 and the stationary cleat 18, and up and out of the cable outlet opening 112. In the form illustrated, the cable inlet openings 106 and 108 and the cable outlet openings 110 and 112 are rounded V-shaped groves formed through the peripheral wall 40 of the base section 14 and corresponding truncated teeth 118, 120, 122, and 124 are formed on peripheral walls of the cover section 16 to closely retain the cables 28 and 30 in place when the housing 12 is in the closed position as is best depicted in FIGS. 3 and 4.

As best seen in FIGS. 1 and 2, the base wall 38 also has a tab 126 extending forwardly therefrom on the left side of the base section 14 of the housing 12 that is opposite the left side with the hinge 32. This tab 126 includes at least one, or a plurality of lock openings 128. The cover section 16 has a slot 130 which is received through a corresponding area of the cover section 16 when the cover is closed so that the tab 126 is received through the slot 130 and the plurality of lock openings 128 are on a side or face of the cover section 16 opposite the stationary cleat 18 and at least two rotatable cleats 20 and 22. The lock openings 128 can be sized to receive a shackle 132 of a padlock 134 or other locking or securement devices (see for example, FIG. 4 illustrating an attached padlock 134) so that when the cover section 16 is closed relative to the base section 14, the presence of one or more locking devices on the tab 126 can prevent the cover section 116 from being opened until the locking devices are all removed. It is understood that while FIGS. 1, 3, and 4 depict a tab 126 with four lock openings 128, the tab 126 may alternatively include a single lock opening 128, or two or more lock openings 128. In an embodiment, the tab 126 includes from 1, or 2 to 3, or 4, or 5, or 6, or 8 lock openings 128. In another embodiment, the tab 126 includes from 1 to 6, or from 2 to 6, or from 2 to 4 lock openings 128. Each of the lock openings 128 may have the same size, or may have a different size than the other lock openings 128; wherein the size of the lock opening 128 is the diameter of the lock opening 128.

In some embodiments, the base section 14 has an integral design with one, some, or all of (i) the tab 126, (ii) the hinge part 34, (iii) the guard walls 102 and 104, (iv) the posts 42, 44, and 46, (v) the spring receiving recesses 78 and 80, (vi) the spring leg receiving slots 82 and 84, (vii) the guidance slots 58 and 60, and/or (viii) the set of fixation holes 48. For example, the base section 14 may have an integral design with each of (i) the tab 126, (ii) the hinge part 34, (iii) the guard walls 102 and 104, (iv) the posts 42, 44, and 46, (v) the spring receiving recesses 78 and 80, (vi) the spring leg receiving slots 82 and 84, (vii) the guidance slots 58 and 60, and (viii) the set of fixation holes 48. In another example, the base section 14 may have an integral design with the hinge part 34, and a composite design with each of (i) the tab 126, (ii) the guard walls 102 and 104, (iii) the posts 42, 44, and 46, (iv) the spring receiving recesses 78 and 80, (v) the spring leg receiving slots 82 and 84, (vi) the guidance slots 58 and 60, and (vii) the set of fixation holes 48. Nonlimiting examples of materials from which to form the base section 14 include metal, plastic, and combinations thereof.

In some embodiments, the cover section 16 has an integral design with one or both of (i) the hinge part 36 and/or (ii) the truncated teeth 118, 120, 122, and 124. Nonlimiting examples of materials from which to form the cover section 16 include metal, plastic, and combinations thereof. The cover section 16 and the base section 16 may be formed from the same material or from different materials.

With reference being had to FIGS. 1, 2, and 5, the cleats will now be further described geometrically and operationally. Looking at FIG. 2 in particular and at the stationary cleat 18, the stationary cleat 18 is American football-shaped and has a pair of tips, with one tip that points up and slightly to the right and with one tip that points down and slightly to the left. The rotatable cleats 20 and 22 are teardrop-shaped also each having a tip. In the case of the leftmost rotatable cleat 20, the tip points down and to the right and is biased in a counter-clockwise direction to be urged towards the tip on the stationary cleat 18 that points down and to the left to provide part of the cable-receiving pathway 114 for cable 28. In the case of the right-most rotatable cleat 22, the tip points up and to the left and is biased in a counter-clockwise direction to be urged towards the tip on the stationary cleat 18 that points up and to the right to provide part of the cable-receiving pathway 116 for cable 30. With this geometric arrangement and the afore-mentioned biasing, the tips and the cleats or grooves will engage the cables and permit them to be pulled through the respective cable-receiving pathways 114 and 116 in one direction, but not the other. For example, the free end of the cable 28 can be pulled downward relative to the orientation of FIG. 2 to reduce the size of a cable loop, but not upward without being pinched and held by the converging tips of the cleats 18 and 20. Likewise, the free end of the cable 30 can be pulled upward relative to the orientation of FIG. 2 to reduce the size of a cable loop, but not downward without being pinched and held by the converging tips of the cleats 18 and 22.

In some embodiments, the multicable lockout device 10 includes three and only three cleats within the housing 12, including (i) one and only one stationary cleat 18 and (ii) two and only two rotatable cleats 20 and 22.

With the various structural parts of the multicable lockout device 10 having been described, the overall operation of the multicable lockout device 10 will now be described.

First, the multicable lockout device 10 is put in an opened position, like the position shown in FIGS. 1 and 2 (although the degree to which the cover section 16 is opened may vary somewhat from that which is shown). If the cables 28 and 30 are not present already (that is, not already attached or connected to the housing 12), then the free end of the cables 28 and 30 are fed through the openings 94 and 96 of the cable end securement points 90 and 92, respectively, until the stops 98 and 100 prevent the further advancement of the cables 28 and 30 and secure the stopped ends.

At this point, cables 28 and 30 may be routed and positioned either with the housing 12 opened or, the housing 12 may be closed and then the cables 28 and 30 routed and positioned and then fed into the housing 12 with the housing 12 in the closed position. In the latter case, it may be helpful to have walls or other structures internal to the housing to direct the free tip of the cable because otherwise it may be very difficult for the opening to be aligned with the cable outlet opening and the tip could dead-end into an internal wall of the housing. Thus, it is contemplated the more preferred situation is initial placement of the cables 28 and while the cover section 16 is still open. In either case, the free end of the cable 28 can be routed through whatever external objects or controls that cable 28 needs to be looped through to form a first loop 136 between the cable end securement point 90 and the cable inlet opening 106, through the cable inlet opening 106, between the stationary cleat 18 and the rotatable cleat 20, and out the cable outlet opening 110. The free end of the cable 30 can be routed though whatever external objects or controls that cable 30 needs to be looped through to form a second loop 138 between the cable end securement point 92 and the cable inlet opening 108, through the cable inlet opening 108, between the stationary cleat 18 and the rotatable cleat 22, and out the cable outlet opening 112.

In either case, the cover portion 16 of the housing 12 is then to be closed as in FIG. 3 to ultimately isolate the various cleats from being accessible and to prevent the cables 28 and once extended through the housing 12, from being withdrawn counter to the gripping action of the cleats. In this way and with the cover section 16 secured, the first loop 136 and the second loop 138 can be made smaller, but not larger, to secure whatever objects or controls the cables 28 and 30 are run. Still further, with the cover section 16 closed, the cables 28 and 30 cannot be pulled forwardly (relative to the orientation on the page) to remove them from the cable receiving pathways 114 and 116 and to disengage them from their respective cleats by virtue of the cover section 16 restricting this forward movement of the cables 28 and 30. To truly prevent access into the closed housing and to establish a lock out of the device 10, a shackle 132 of a padlock 134 can be inserted through one or more of the openings 128 in the tab 126 to prevent the cover portion 16 from being opened relative to the base section 14. In this way, the multicable lockout device 10, can be used to "lockout" objects or controls and the first loop 136 and second loop 138 cannot be broken until the padlock 134 is removed and the cover section 16 is opened. Further, in the case where multiple users have secured padlocks through different lock openings 128, the housing 12 can be secured shut until all the various padlocks are removed. This can be useful in a circumstance in which the same controls to be locked out for various users simultaneously, and the multicable lockout device 10 not removed until all users have completed their work and removed their respective padlocks.

Once the lockout device 10 is no longer required and all users have removed their locking devices, then the cover section 16 may be opened and the cables 28 and 30 pulled forward out of their respective cable-receiving pathways 114 and 116 to remove the cables 28 and 30 from between the various cleats and from their previous one-way engagement therewith. Thus, with the housing 12 opened, the first loop 136 and the second loop 138 can be broken and the multicable lockout device 10 removed from whatever controls or objects to which it may be attached.

This multicable lockout device 10 could be used on its own, or in combination with other features/lockout elements. When used on its own, for example, one cable could wrap around a valve handle and the other could wrap around a neighboring pipe to lock the valve handle in place relative to the pipe. In yet another alternative, each cable could be wrapped around a different valve handle to lock them both in place. Still further, the multiple cable lockout might be included in a device having other lockout mechanism in it. For example, the housing itself could be attached to a wall or another structure (including a structure with further lockout structures), or it may not be attached to anything. In one embodiment, the multicable lockout structure could be used as the cable lockout element of a structure having a combined clamping lockout and cable lockout such as is described in U.S. patent application Ser. No. 17/559,532 filed Dec. 22, 2021, which is incorporated by reference for all purposes; however, that cable lockout device only depicted a single cable lockout with a clamping mechanism in which both could be locked out at a single point, even though both were separately operable. It is contemplated that that structure could be modified to include the two-cable design or a multicable design as disclosed herein instead of a single cable lockout and clamp.

In an embodiment, a user may utilize the present multicable lockout device 10 to lock the handle of a valve control (such as a quarter-turn ball valve handle, a butterfly handle, a gate valve handle, a three-way valve handle, a four-way valve handle, a five-way valve handle, a T-handle, or a ring handle), thereby preventing the handle from being inadvertently moved.

Furthermore, while multicable lockout device is illustrated with two cables and three cleats, some variations to this system might be made without deviating from the scope and spirit of this disclosure.

As one example, while the cable end securement points are on opposing sides of the housing, the cable end securement points could be positioned on the same sides. Further, it is contemplated that in such an arrangement, the tips of the cleats could be differently arranged so that perhaps both free ends enter cable inlet openings on the same side of the peripheral walls of the housing. While it is likely easier to route the cables entirely through the housing with the housing still open, in the case where the housing is closed before the cables would be routed through the housing, this could create a better sense of directionality with respect to which opening on the housing are inlets versus outlets (although it is also contemplated these openings could also be marked).

As another example, rather than having three cleats for independently securing two cables, it is contemplated that other cleat and cable configurations could be employed in which there is a shared stationary cleat. For example, a differently shaped housing and cleat arrangement could have a single central stationary cleat with three rotatable cleats evenly spaced around the stationary cleat, perhaps with rotational axes that are spaced at approximately 120 degrees from center of the stationary cleat. The device could then potentially include three cables with the housing providing three cable end securement points for the securable ends of the cables. This arrangement might provide three cable-receiving pathways between the stationary cleat and the respective rotatable cleats.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A multicable lockout device comprising:
   a housing including at least two cable end securement points, the housing having a base section and cover section that is movable relative to the base section between an opened position and a closed position;
   a stationary cleat fixed relative to the base section of the housing;
   at least two rotatable cleats attached to the base section, in which each of the respective rotatable cleats is positioned adjacent to the stationary cleat with a respective cable-receiving pathway being defined between the stationary cleat and each of the respective rotatable cleats, the respective rotatable cleats each having a tip biased towards the stationary cleat to facilitate one-way gripping action of a cable along the respective cable-receiving pathway; and
   wherein, when in the closed position, the respective cable-receiving pathways between the stationary cleat and each respective rotatable cleat are securably covered by the cover section and the cover section is lockable relative to base section to prevent the cover section from being taken out of the closed position while locked.

2. The multicable lockout device of claim 1, further comprising at least two cables, wherein each one of the at least two cables have a respective first end secured at one of the at least two cable end securement points of the housing.

3. The multicable lockout device of claim 2, each one of the at least two cables also have a respective second end that is receivable through one of the respective cable-receiving pathways.

4. The multicable lockout device of claim 1, further comprising a hinge connecting the base section to the cover section.

5. The multicable lockout device of claim 4, wherein the hinge includes a pair of hinge parts in which one of the hinge parts is an integral part of the base section and another of the hinge parts is an integral part of the cover section.

6. The multicable lockout device of claim 1, wherein the at least two rotatable cleats are on opposing sides of the stationary cleat such that the respective cable-receiving pathways are on opposing sides of the stationary cleat.

7. The multicable lockout device of claim 6, wherein each of the at least two rotatable cleats have a respective axis of rotation and the stationary cleat is positioned along a line between the respective axes of rotation of the at least two rotatable cleats.

8. The multicable lockout device of claim 1, wherein the base section has a tab with a plurality of lock openings and the cover section has a slot for receiving the tab when the cover section is in the closed position.

9. The multicable lockout device of claim 8, wherein, when the cover section is in the closed position, the plurality of lock openings is on a side of the cover section opposite the stationary cleat and at least two rotatable cleats.

10. The multicable lockout device of claim 8, wherein the plurality of lock openings is sized to receive a shackle of a padlock to lock the cover section in the closed position.

11. The multicable lockout device of claim 1, wherein the at least two cable end securement points are on oppositely facing peripheral sides of the housing.

12. The multicable lockout device of claim 1, wherein the housing includes peripheral walls as part of one or more of the base section and cover section and the peripheral walls include cable openings formed therein between the base section and the cover section for accommodating passage of a cable therethrough, which cable is also passable through at least one of the respective cable-receiving pathways.

13. The multicable lockout device of claim 1, wherein at least two rotatable cleats are biased by a respective torsion spring with legs that separately engage the base section and part of the respective rotatable cleats.

14. The multicable lockout device of claim 1, wherein the at least two rotatable cleats include guidance pegs which are received in guidance slots in the base section of the housing, an interaction of the guidance pegs with the guidance slots delimiting an angular rotation of the at least two rotatable cleats.

15. The multicable lockout device of claim 1, wherein the stationary cleat includes at least one fixation peg which is received in at least one fixation hole in the base section of the housing, an interaction of the at least one fixation peg and the at least one fixation hole preventing the stationary cleat from rotating relative to the base section of the housing.

* * * * *